United States Patent Office 3,809,543
Patented May 7, 1974

3,809,543
METHOD OF MAKING GLASS CERAMIC MATERIALS ON MOLTEN METAL SUPPORT
Philip Hedley Gaskell, Preston, Stanley Lythgoe, Parbold, Philip Sidney Irlam, Southport, Robert Percy Miller, Sunbury-on-Thames, and Thomas Ian Barry, Hampton Hill, England, assignors to Pilkington Brothers Limited, Liverpool, England
Filed Feb. 16, 1972, Ser. No. 226,857
Claims priority, application Great Britain, Feb. 19, 1971, 5,018/71
Int. Cl. C03b 18/00, 29/00
U.S. Cl. 65—33                                12 Claims

ABSTRACT OF THE DISCLOSURE

The invention relates to a method of manufacturing a fine-grained glass ceramic material from a thermally-crystallizable vitreous material, which may be an $Li_2O$—$Al_2O_3$—$SiO_2$ composition containing a nucleating agent such as $P_2O_5$, $ZrO_2$ or $TiO_2$, in which method the material is shaped and thereafter supported throughout the subsequent thermal processing, which is preferably effected on a non-wettable support such as a bath of molten metal, e.g. tin. The thermal processing essentially comprises subjecting the shaped material to a temperature/time regime which develops within the material a uniform dispersion of embryonic centers of incipient crystal growth, and then rapidly heating the material at a controlled rate to a predetermined crystallization temperature to effect fine-grained crystal growth on those centers while the viscosity of the glassy matrix of the crystallizing material is at a value which permits rapid stress relaxation.

BACKGROUND OF THE INVENTION (1) Field of the invention

This invention relates to glass ceramic materials and methods of manufacturing those materials.

(2) Description of the prior art

It is known that certain glasses are capable of controlled crystallization to form strong glass ceramic materials. For example glass ceramic materials have been made by crystallization of glasses of the following systems:

$SiO_2$—$Al_2O_3$—$Li_2O$
$SiO_2$—$Al_2O_3$—$MgO$
$SiO_2$—$Al_2O_3$—$BaO$

The glass customarily contains a proportion of a nucleating oxide, e.g. $TiO_2$, $ZrO_2$ or $P_2O_5$.

Usually the homogeneous melt is shaped by a conventional forming process, e.g. by moulding or extrusion, and in the course of the forming process the glass is cooled to a temperature at which it holds its shape. Thereafter the formed glass is held for a time, sometimes a matter of hours, to develop a degree of nucleation in the material, and thereafter the nucleated material is slowly heated at a rate, e.g. 5° C. min.$^{-1}$, at which, at the onset of crystallization, the glass is still sufficiently viscous to hold its shape, and as the temperature rises further thereafter and the rate of crystallization increases, a balance is struck between the increase in stiffness of the material due to its increasing crystallinity, and the decrease in viscosity of the vitreous matrix in which crystal growth is taking place. The preformed shape of the material is not then modified during the crystallization process. The slow heating rate has also been thought necessary to ensure that no damaging stresses are generated within the material, which could cause cracking for example.

A long process time has been necessary in order to satisfy these requirements; sometimes up to 2 or 3 hours or more; and it is a main object of the present invention to develop a new concept in the manufacture of glass ceramics whereby process time is considerably reduced without detracting from the quality of the material produced at a high rate of processing.

SUMMARY

This invention is based on the discovery that crystallization can occur on a dispersion of embryonic centers of incipient crystal growth in the material, which dispersion is itself insufficiently developed to produce a self-supporting network of crystals within the material, if the temperature of the material is rapidly raised from a temperature at which that dispersion exists to a selected crystallization temperature range which is conducive to rapid crystal growth on those centers, and that the rapid raising of the temperature can permit internal stresses to be relieved without damaging the material.

According to the invention a method of manufacturing a fine-grained glass ceramic material from a thermally-crystallizable vitreous material, comprises shaping the material and thereafter maintaining support of the shaped material, subjecting the supported material for a limited time to a temperature/time regime which generates throughout the material a uniform dispersion of embryonic centers of incipient crystal growth, and rapidly heating the material at a controlled rate to a predetermined crystallization temperature to effect fine-grained crystal growth on those embryonic centers.

The preferred manner of operating the invention may be expressed as a method of manufacturing a fine-grained glass ceramic material comprising forming a thermally crystallizable vitreous material, shaping the material and thereafter maintaining support of the shaped material, subjecting the shaped material to a temperature/time regime which develops within the material a uniform dispersion of embryonic centers of incipient crystal growth, and rapidly heating the material at a controlled rate to a predetermined crystallization temperature to effect fine-grained crystal growth on these embryonic centers to a required degree of crystallinity while the viscosity of the glassy matrix of the crystallizing material is at a value permitting rapid stress relaxation.

The generation time for the dispersion of embryonic centers of incipient crystal growth can be very short. The material may only need a residence time of from 2 to 30 minutes in the temperature range in which the centers develop, before the rapid heating to the crystallization temperature range which causes rapid crystal growth. With certain materials, the dispersion of centers may be generated as part of a continuous rapid heating sequence to the temperature range where crystal growth is rapid.

The invention is particularly applicable to a continuous method of manufacturing a glass ceramic material comprising forming a melt of a thermally crystallizable vitreous material, continuously advancing a ribbon of that material along a non-wettable support, cooling the advancing ribbon and subjecting it to a temperature/time regime under which a uniform dispersion of embryonic centers of crystal growth develop in the material, subjecting the ribbon as it is further advanced to a steeply rising temperature profile so as to heat the ribbon rapidly at a controlled rate sufficient to retain the character of that dispersion in the material while it is heated to a predetermined crystallization temperature to effect crystal growth on those embryonic centers, which temperature profile is effective to maintain the ribbon at crystallization temperature for a time just sufficient to consolidate a required degree of crystallinity, and thereafter cooling the ribbon of fine-grained glass ceramic so formed prior to its removal from the support.

Fine control of the quality of the glass ceramic material produced may be achieved by inter-relating the temperature/time regime for development of said dispersion, and the controlled rate of rapid heating to produce a required degree of crystallinity, crystallite size distribution and crystal species in the ceramic.

The invention also comprehends a fine-grained glass ceramic material produced by a method as described above.

DESCRIPTION OF THE PREFERRED EMBODIMENTS

Figure 4:
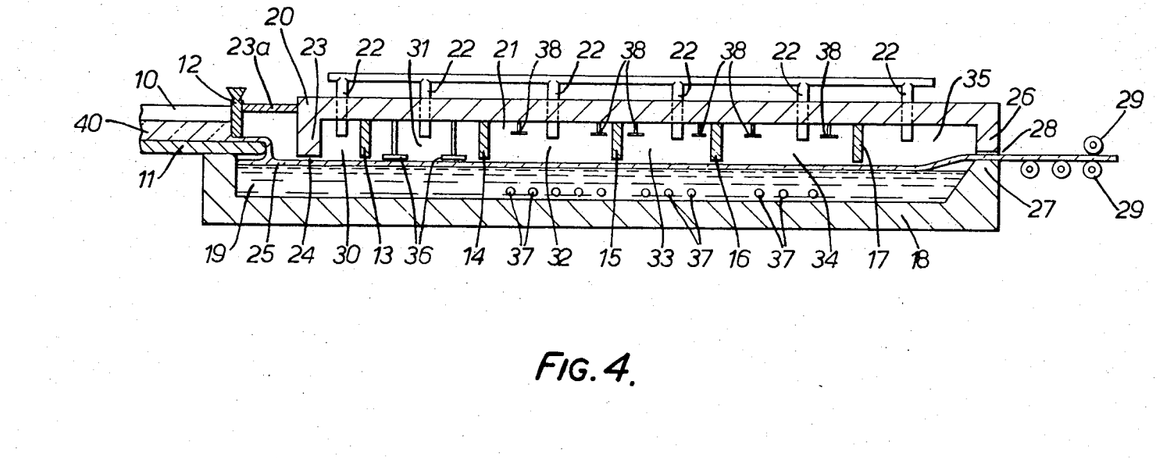
FIG. 4 is a diagrammatic sectional elevation of an apparatus for manufacturing a glass ceramic material by a two-stage heat treatment according to the invention, using a molten tin support.

The method of the invention can be applied to vitreous materials in various ways but it is preferred to apply it to such materials in the form of a ribbon advanced along the surface of a bath of molten metal, for example molten tin or a molten tin alloy in which tin predominates, in an apparatus such as that diagrammatically illustrated in FIG. 4.

Figure 1:
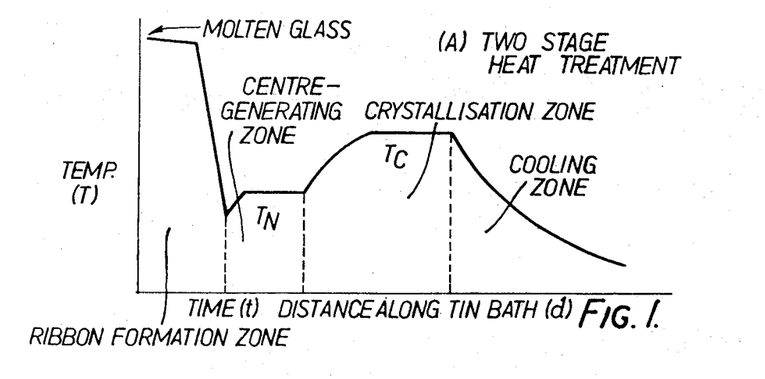
FIG. 1 is a graphical representation of a two-stage heat treatment for manufacturing a glass ceramic material according to the invention, showing temperature plotted against time.

In FIG. 1, the temperature of the vitreous material is plotted against time. In the method illustrated in FIG. 4, the time is proportional to the distance which the particular portion of vitreous material has travelled along the tin bath. It will be seen that the process illustrated starts with molten glass at a very high temperature, which is cooled rapidly to a temperature below the temperature $T_N$. This rapid cooling has been found advisable for reducing the time spent by the glass at or near the temperature $T_N$ before controlled generation of embryonic centers is begun. The glass temperature is then raised to $T_N$ and remains at this temperature for a predetermined period of time which is chosen so as to be sufficient to generate throughout the material a uniform dispersion of embryonic centers of incipient crystal growth, without growing on those centers a substantial accretion of crystalline material as has been commonly done in nucleation procedures in the past. Thereafter the glass temperature is raised rapidly through the crystallization temperature range to induce crystal growth on the centers generated in the preceding step, and is then held at a temperature $T_C$ in the higher end of the crystallization temperature range for the time required to achieve desired physical properties. The glass ceramic is then cooled to room temperature.

Figure 2:
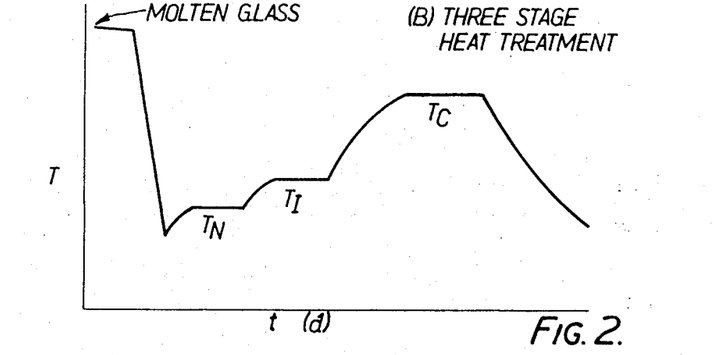
FIG. 2 is a similar representative of a three-stage treatment according to the invention.

FIG. 2 shows a modification of the process of FIG. 1, in which a second step is provided between the initial growth of embryonic centers and the final crystallization step, in which the glass is rapidly heated and then held at a temperature $T_I$ (in a range intermediate between that where generation of embryonic centers can occur and the final crystallization range) for a predetermined time to allow some accretion of crystalline material to take place on the embryonic centers before the glass is heated to the range in which crystallization is completed.

Figure 3:
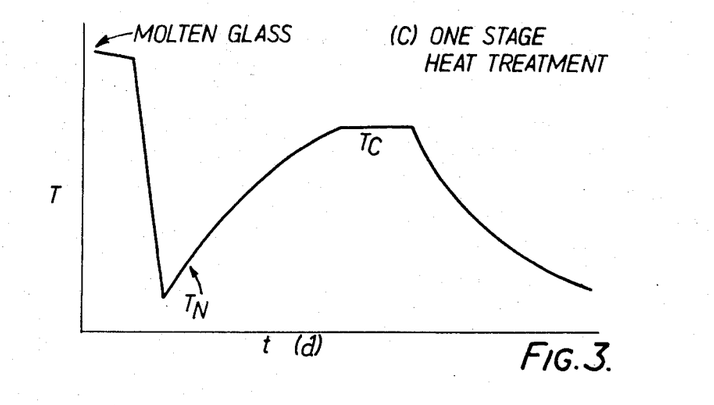
FIG. 3 is a similar representation of a single-stage treatment according to the invention.

FIG. 3 illustrates an alternative treatment for materials in which growth of embryonic centers takes place particularly rapidly. In this case the separate hold at an intermediate temperature is eliminated. The molten glass is rapidly cooled to a temperature below $T_N$ and is then heated rapidly through the temperature $T_N$ up to $T_C$, held at that temperature for a predetermined period and then cooled.

FIG. 4 illustrates diagrammatically an apparatus for carrying out the process of FIG. 1. In FIG. 4, the forehearth of a continuous glass melting furnace is indicated at 10, and a spout of rectangular cross section at 11. A gate 12 is adjustably suspended above the spout. The molten glass 40 flows forwardly and downwardly from the spout 11 to form a ribbon 25.

The ribbon forming means just described is disposed over one end of a tank generally indicated at 18 which contains a bath 19 of molten metal, specifically molten tin. The tank 18 is provided with a roof 20 enclosing a head space 21 extending over the greater part of the surface of the tin bath 19. A protective atmosphere of non-oxidizing gas, e.g. a mixture of nitrogen and 5% hydrogen, is fed into the head space 21 through ducts 22 to prevent the formation in the tin bath of contaminants for the glass.

The end wall 23 at the inlet end of the roof 20 extends downwardly towards the surface of the tin bath 19 and defines an inlet aperture 24 through which the ribbon 25 of glass can pass. A cover 23a extends between the end wall 23 and the gate 12 to protect the glass ribbon 25 at this point. The opposite end wall 26 of the roof 20 at the outlet end of the bath 18 extends downwardly towards the corresponding end wall 27 of the tank 18 to define an outlet 28 through which the cooled ribbon of glass ceramic can be taken undamaged from the tin bath 19 by mechanical means, illustrated as drawing rollers 29.

For the purposes of the present invention, the cover 20 is provided with depending transverse partitions 13, 14, 15, 16, 17, spaced along its length and reaching down to positions closely above the upper surface of the ribbon 25. The space between the end wall 23 and the first partition 13 forms the ribbon formation zone 30 in which the glass spreads laterally on the surface of the tin bath 19 to the limit of its free flow. The space between partitions 13 and 14 forms an initial cooling zone 31. Between partitions 14 and 15 is a center-generating zone 32, and between partitions 15 and 16 is a gradient heating zone 33. The space between partitions 16 and 17 forms the crystallization zone 34, and the space between partition 17 and the exit aperture 28 forms the final cooling zone 35. In the initial cooling zone 31, cooling elements 36 are provided. In the center-generating and crystallization zones 32, 33, electric heaters diagrammatically indicated at 37 are provided in the tin bath 18 and further radiant electric heaters 38 are secured to the undersurface of the cover 20.

In use, molten glass is delivered from the forehearth 10 in the form of a ribbon 25 onto the upper surface of the molten tin bath 19, on which it is supported during the subsequent heat treatment. After the ribbon formation in zone 30, the glass is rapidly cooled in zone 31 from the very high temperature of the molten glass down to a temperature below the center-generating temperature $T_N$. On passing the partition 14 into the center-generating zone 32, the heaters 37, 38 rapidly heat the ribbon to the temperature $T_N$ and hold it at this temperature for the required time. The ribbon passes under the partition 15 from the zone 32 to the gradient heating zone 33, in which the heaters 37, 38 rapidly heat the glass to a temperature $T_c$ in the upper part of the crystallization range. The ribbon 25 then passes under partition 16 into the crystallization zone 34 in which the heaters 37, 38 maintain the ribbon at the crystallization temperature $T_C$ for the required time. On passing under the partition 17 out of the crystallization zone 34 into the final cooling zone 35, the ribbon is cooled to a temperature at which it can be removed from the bath 18 by conventional handling means, e.g. the draw rolls 29.

The times which the glass ribbon 25 spends in each zone 30, 31, 32, 33, 34, 35 can be altered to suit the particular vitreous material by altering the speed of movement of the ribbon 25 through the apparatus and/or by altering the positions of the partition walls 13, 14, 15, 16, 17 along the length of the bath 18.

To enable a three-stage treatment to be performed in accordance with FIG. 2, an additional partition (not shown) may be incorporated between partitions 14 and 15. For performing a single-stage treatment according to FIG. 3, partition 15 may be omitted.

The temperature $T_N$, the time $t_n$ for which the glass is held at that temperature, the rate R at which the glass is subsequently rapidly heated to the crystallization temperature $T_C$ and the crystallization time $t_c$ for which it is held at the crystallization temperature can all vary according to the particular vitreous material which is being employed, and various methods may be used to determine the optimum values for these parameters.

Figure 5:
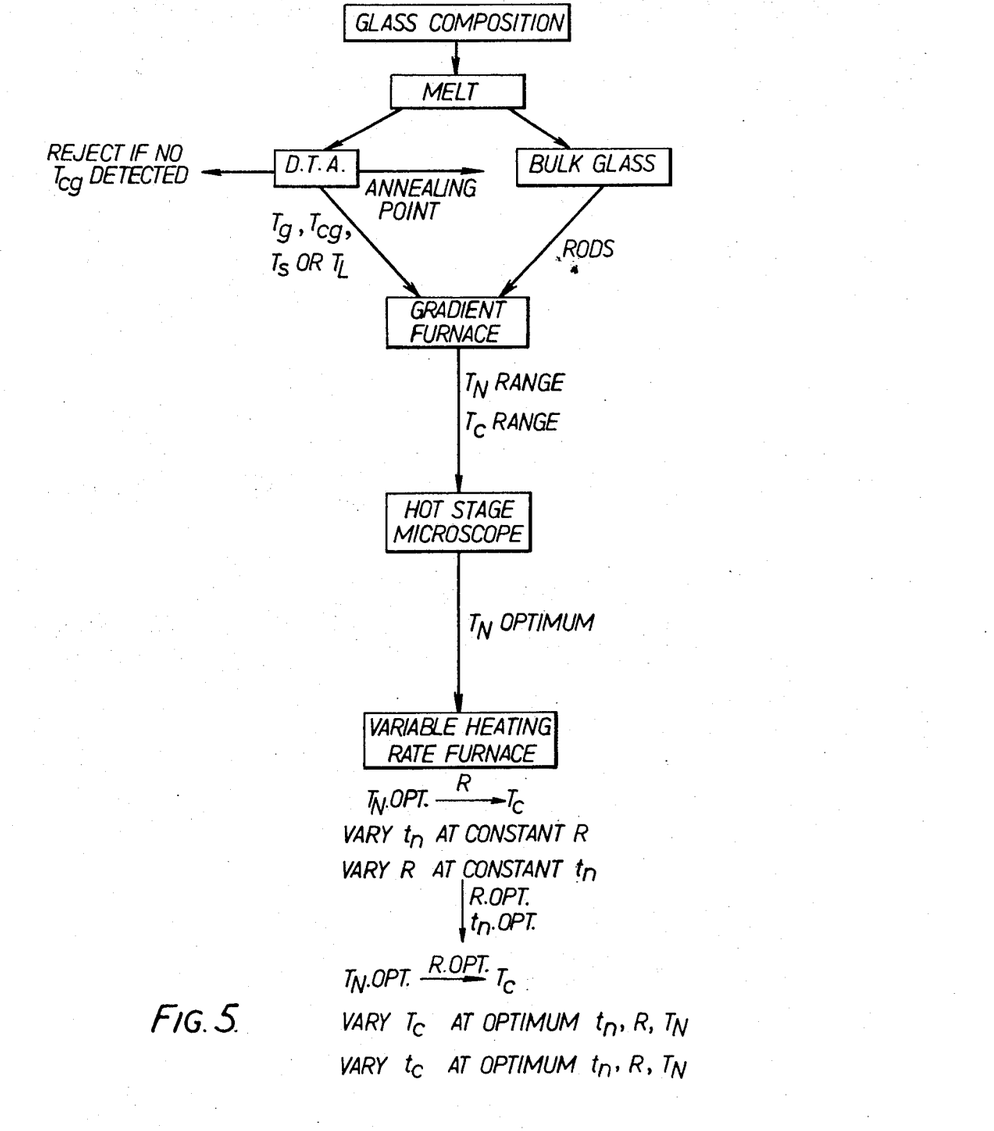
FIG. 5 is a schematic diagram illustrating the manner in which the optimum conditions for a process according to the invention can be selected.

One manner in which the optimum conditions for treating a given vitreous material may be determined is diagrammatically illustrated in FIG. 5. A preliminary selection of a composition which is likely to be capable of forming a glass ceramic can be made on known principles.

A small batch of a selected composition is then melted and subjected to the known technique of differential thermal analysis to locate the exothermic and endothermic points which occur as a glass is heated or cooled, as well as the liquidus or solidus temperatures. An exothermic point generally occurs as the material crystallizes at a significant rate. Different exotherms may be noted at different temperatures (referred to below as Tcg) indicating the crystallization of different solid phases. An endothermic point is found at the transformation or transition temperature ($T_g$).

If no indication of a crystallization exotherm can be detected, the composition must be rejected, but assuming that such an exotherm is detected one then determines the appropriate annealing point from the transformation temperature in known manner (generally at around $T_g-30°$ C.) and prepares a bulk sample of the glass, which is cast into rods. Sample rods can then be treated in a gradient furnace which establishes a temperature gradient along their length, to determine the ranges of temperatures in which growth of centers and crystallization will take place. In most cases, the range for growth of centers will be found to be between $T_g$ and $T_g+220°$ C.

By use of a hot stage microscope, examining small samples of the glass at varying temperatures within the range indicated by the preceding step, one can arrive at an optimum value for the temperature $T_N$.

The next step is to use a furnace with a variable heating rate to heat small samples of glass at the optimum $T_N$ for varying times $t_n$ and then to heat them rapidly at a constant rate R ° C. min.$^{-1}$ to a selected crystallization temperature $T_c$, generally between Tcg to $T_L-50°$ C., where Tcg is the temperature of the lowest crystallization exotherm, where $T_L$ is the liquidus temperature of the glass. When the optimum time $t_n$ has been found, it is kept constant in further experiments in which R is varied.

When optimum values for $T_N$, $t_n$ and R have thus been ascertained, further small samples are similarly treated, first using varying values of $T_c$ and then using varying values of the crystallization time $t_c$, until optimum values of both have been determined.

The invention is applicable to a wide range of vitreous materials which are capable of crystallization to form a ceramic. Materials containing $SiO_2$ and one or more of the components $Al_2O_3$, MgO, BaO, $Li_2O$ and ZnO, are effective for the production of high strength fine-grained glass ceramic materials when subjected to the thermal process of the present invention. Table I sets out, in percentages by weight, a range of glass compositions which can be employed. In each of these glass compositions there is a content of one or more nucleation oxides of the group $TiO_2$, $ZrO_2$ and $P_2O_5$, although compositions which are self-nucleating or which use other nucleating agents can be used.

TABLE I

| Glass number | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| Weight percent: | | | | | | | | | | | | | | | | | | | | |
| $SiO_2$ | 45.5 | 48.9 | 54.7 | 59.6 | 61.2 | 63.5 | 64.1 | 65.4 | 66.7 | 66.8 | 68.5 | 68.5 | 69.2 | 67.3 | 78.5 | 48.5 | 50.0 | 53.2 | 35.3 | 66.48 |
| $Al_2O_3$ | 30.5 | 14.7 | 18.6 | 17.8 | 18.3 | 15.4 | 15.5 | 18.5 | 22.1 | 16.3 | 19.2 | 19.2 | 20.0 | 20.2 | 3.9 | 30.0 | 29.1 | 9.5 | 31.5 | 22.1 |
| $Li_2O$ | | 2.9 | 16.3 | 4.4 | 5.4 | 3.2 | | 5.4 | 3.4 | 3.1 | 3.8 | 3.8 | 2.5 | 2.9 | 12.1 | 8.9 | | | | 3.4 |
| $TiO_2$ | 11.5 | 9.0 | | | | 5.0 | 4.0 | | 3.8 | 5.0 | | 1.8 | 4.4 | | | | 9.1 | 10.8 | 7.4 | 3.8 |
| $ZrO_2$ | | | | 5.5 | | | | 6.2 | | | 3.3 | 1.5 | | 3.8 | | 6.3 | | | | |
| $P_2O_5$ | | | 3.0 | | 2.4 | | | | | | 1.5 | 1.5 | | | 3.0 | | | | | |
| BaO | | 14.0 | | | | 6.9 | 7.0 | | | | | | | | | | | | 12.9 | |
| MgO | 12.5 | 10.5 | 7.4 | | | 6.1 | 6.1 | | 1.6 | 8.3 | | | 3.3 | 2.9 | | | 11.8 | 22.4 | | 1.6 |
| CaO | | | | | | | | | 0.1 | | | | | | | | | | | 0.1 |
| ZnO | | | | 5.1 | 5.3 | | | | 0.7 | | 3.1 | 3.1 | | 2.9 | | | | | | 0.7 |
| $B_2O_3$ | | | | | | | 4.5 | | | | | | | | | 6.3 | | | | 0.1 |
| $MoO_3$ | | | | 4.3 | 3.3 | | | | | | | | | | | | | | | |
| $Na_2O$ | | | | | | | | | 0.8 | 0.5 | 0.4 | 0.4 | 0.5 | | | | | | 12.9 | 0.8 |
| $K_2O$ | | | | 3.3 | 4.2 | | | | 0.7 | | 0.1 | 0.1 | | | 2.5 | | | 1.8 | | 0.7 |
| $F_2$ | | | | | | | | | 0.1 | | | | | 0.1 | | | | 2.3 | | 0.1 |
| $As_2O_3$ | | | | | | | | | | | | | | | | | | | | 0.1 |
| $Sb_2O_3$ | | | | | | | | | | | | | | | | | | | | 0.02 |
| Tcg (° C.) | 863 | 745 | 677 | 769 | | 991 | 755 | 886 | | 716 | 920 | 830 | 765 | | 821 | | 890 | 1,014 | | |
| | 946 | 820 | | 792 | | 923 | 780 | 852 | 913 | 820 | 887 | 810 | 860 | 926 | 599 | 813 | 1,145 | 828 | | 944 |
| | | | 855 | | | 884 | 820 | 788 | | 910 | | | 1,020 | | | | | 790 | | |
| | | | | | | 595 | 880 | | | | | | | | | | | | | |
| Tg (° C.) | 783 | 625 | 511 | 530 | | 508 | 645 | 763 | 726 | 660 | 742 | 689 | 690 | 754 | 488 | 660 | 755 | 722 | 770 | 720 |

In the preparation of a glass ceramic material from any one of these glasses the glass composition is melted in a customary manner and the homogeneous melt which is formed is poured onto a thermally conductive support to shape the melt into the form of a glass sheet. The support is so constituted that there can be a high rate of heat transfer between the supported material and the support, which heat transfer takes place uniformly over the whole support so that the whole of the material is subjected to the same thermal conditions.

The support may for example be molten metal, as in the apparatus described above with reference to FIG. 4. Alternatively it may be a support of a solid material, for example carbon or a metal foil or sheet. In any case, the support is maintained throughout the thermal treatment of the material.

A number of examples of methods of manufacturing ceramic materials from the glass compositions of Table I will now be given.

In all the examples given below the strength of the ceramic material produced is expressed in terms of the modulus of rupture which was measured in bending on an abraded sample of square cross section. Expansion co-efficients were averaged over the temperature range 25° C. to 500° C., and the degree of crystallinity was obtained from an analysis of the intensity of X-ray scattering as determined by X-ray diffraction analysis of a powder sample in a focussing camera.

EXAMPLE 1

A melt of glass No. 1 was produced and was poured onto a molten tin support. The melt spread on the support to form a layer which was then cooled rapidly to about the strain point of the vitreous material. Thereafter the supported material was heated to a temperature of 820° C. and was held at that temperature for about 5 minutes to generate within the glass a uniform dispersion of embryonic centers of incipient crystal growth. It is believed that heating the vitreous material to 820° C. and holding at that temperature for 5 minutes produces a very fine and uniform dispersion of such centers throughout the material. These centers are insufficiently developed to produce a self-supporting network of crystals within the material.

The material was then heated at a rate of 300° C. min.$^{-1}$ up to a temperature of 1250° C. and there was a substantial rate of crystal growth without an undesirable degree of re-absorption of the embryonic centers into the body of the material. Crystal growth was thereby rapidly initiated on a high proportion of the centers so that the final product was a fine-grained material. This distribution of micro-crystalline growth has the character of a dispersion and since there is rapidly enforced on the material a temperature at which there is the high rate of crystal growth, the rapid heating method ensures that the eventual crystalline growth takes place on the dispersed centers throughout the material.

The high rate of crystal growth takes place at a temperature at which the viscosity of the glassy matrix of the material is at a value permitting relaxation of stresses which would otherwise be generated in the material as the crystals form.

The fine-grained glass ceramic so produced had a modulus of rupture of 176 MN.m.$^{-2}$ and the crystalline phases were β-quartz solid solution and magnesium aluminium titanate. The degree of crystallinity was 93% with an estimated uncertainty of 7%. The heating process time was 6.5 minutes.

EXAMPLE 2

Glass No. 1 was melted and poured onto a molten tin support to form a shaped layer of the material on the support. The shaped material was rapidly cooled to 750° C. and then heated at the rate of 110° C. min.$^{-1}$ up to a temperature of 1090° C. For a limited time during which the material was passing through a temperature in the range of 800° C. the centers of incipient crystal growth were being produced in the glass and the subsequent crystallization, completed while the glass was held at 1090° C. for 4 minutes, resulted in a glass ceramic material having a modulus of rupture of 180 MN.m.$^{-2}$ and an average expansion coefficient over the temperature range 25° C. to 500° C. of $53 \times 10^{-7}$ ° C.$^{-1}$. The total heating process time was 7 minutes, and the crystalline phases present were β-quartz solid solution (a solid solution with the β-quartz structure), spinel and magnesium aluminium titanate. The crystallite size, estimated from an electron micrograph of a replicated fresh fracture surface of the ceramic, was in the range 1 to 2 μm.

EXAMPLE 3

A melt of glass No. 2 was produced and was poured onto a molten tin support in the same manner as for Example 1. The supported layer was cooled to about 600° C. and then heated rapidly at a rate of 80° C. min.$^{-1}$ up to a temperature of 1020° C. where it was held for about 5 minutes. The uniform dispersion of embryonic centers of crystal growth developed throughout the material as it passed through the temperature region about 675° C. The hold time of 5 minutes and the high temperature of 1020° C. were chosen to consolidate the interlocking structure of fine-grained crystal particles and to develop the required strength and properties of the product. The material was at the upper crystallization temperature for just sufficient time to produce the desired crystal phases and to consolidate the required degree of crystallinity of the principal crystal phases, pseudohexacelsian and β-spodumene. The crystallite size was in the ranges 0.2 to 0.5 μm. and 2 to 6 μm. The modulus of rupture of the glass ceramic material was 138 MN.m.$^{-2}$, its coefficient of expansion was $68.5 \times 10^{-7}$ ° C.$^{-1}$, and it had a high abrasion resistance. The heating process time was 10 minutes.

EXAMPLE 4

Glass No. 3 was subjected to a similar procedure to that described in Example 1. The material is initially cooled to a temperature below 500° C. and then heated at a rate of 45° C. min.$^{-1}$ through the temperature range of 510° C. to 560° C. within which range the dispersion of growth centers in the glass is formed. Thereafter the heating continued to a hold temperature of 1030° C. and by the time the material reached that temperature it had achieved the form of a fine-grained glass ceramic material having a modulus of rupture of 150 MN.m.$^{-2}$.

The crystallite size was in the range 2 to 5 μm. and the crystalline phase present in the material was β-spodumene solid solution. The degree of crystallinity was greater than 88%.

The total heating process time was 12 minutes.

EXAMPLE 5

Glass No. 3 was subjected to a similar procedure to that described in Example 1, and was heated from a temperature of 500° C. or below through the range of 510° C. to 560° C. at a rapid heating rate of 150° C. min.$^{-1}$ up to a temperature of 1000° C. By the time the material reached that temperature it had been transformed to a fine-grained glass ceramic whose modulus of rupture was 114 MN.m.$^{-2}$, whose expansion coefficient was $45 \times 10^{-7}$ ° C.$^{-1}$ and which comprised crystallites whose size was in the range of 1 to 3 μm. The crystalline phases present were β-eucryptite and lithium metasilicate and degree of crystallinity was 98%. The total heating process time was 3 minutes.

EXAMPLE 6

Glass No. 4 was melted and poured onto a molten tin support and cooled rapidly on the support to a temperature of about 500° C. The shaped and supported material was then heated at a rate of 45° C. min.$^{-1}$ through the temperature of 580° C. in the region of which the distribution of centers of incipient crystal growth are believed to be formed as a uniform dispersion throughout the material.

The heating rate continued up to a temperature of 990° C. and by the time the vitreous material had reached that temperature it was in the form of a fine-grained glass ceramic material having a modulus of rupture of 65 MN.m.$^{-2}$ and an expansion coefficient of $18.7 \times 10^{-7}$ ° C.$^{-1}$.

The crystallite size was in the range 0.1 to 2 μm., and the crystalline phases present were β-spodumene and zirconia. The heating process time was 9 minutes.

EXAMPLE 7

Glass No. 4 was again formed into a layer on a support of molten tin and was subjected to a more rapid heating rate of 150° C. min.$^{-1}$ up to a temperature of 1070° C. The modulus of rupture of the resulting ceramic material was 70 MN.m.$^{-2}$ and the expansion coefficient was $7 \times 10^{-7}$ ° C.$^{-1}$.

The crystalline phases in the resulting glass ceramic were β-eucryptite and zirconia, with crystallite size of about 2 μm. The heating process time was 3 minutes.

EXAMPLE 8

Glass No. 5 was melted and poured onto a molten tin support to form a layer which was cooled, while supported, down to a temperature of about 500° C. Thereafter the supported material was heated at a rate of 45°

C. min.$^{-1}$ up to a temperature of 1100° C. and by the time the glass reached that temperature it had crystallized completely to a glass ceramic material having a modulus of rupture of 98 MN.m.$^{-2}$ and an expansion coefficient of $25.5 \times 10^{-7}$ °C.$^{-1}$. The crystallite size was from 1 to 2 μm. and the main crystal phase was β-spodumene. The heating process time was 13 minutes.

EXAMPLE 9

By subjecting glass No. 5 to a higher heating rate of 150° C. min.$^{-1}$ up to a temperature of 1080° C. the glass ceramic material produced in a much shorter process time of 4 minutes, had similar physical characteristics to that of Example 7, namely a modulus of rupture of 93 MN.m.$^{-2}$ and an expansion coefficient of $26 \times 10^{-7}$ °C.$^{-1}$ but a smaller crystallite size of 1 μm. This again indicates that the rapid heating of the material through the temperature range where rapid crystal growth takes place can result in the formation of a fine distribution of smaller crystallites than are produced when the heating rate is somewhat less rapid.

EXAMPLE 10

Glass No. 6 was melted and formed into a layer on a molten tin support and cooled to about 600° C. The supported shaped material was then heated at a rate of 80° C. min.$^{-1}$ and at a temperature in the region of 690° C. the centers of crystal growth formed. Thereafter the heating at the rate of 80° C. min.$^{-1}$ continued up to a hold temperature of 1040° C. where the glass was held for 5 minutes. The resulting glass ceramic material had a modulus of rupture of 152 MN.m.$^{-2}$ and a coefficient of expansion of $19 \times 10^{-7}$ ° C.$^{-1}$. The total proces time was 10 minutes. The crystalline phase in the ceramic was β-quartz solid solution. There were small crystallites of about 0.1 μm. size and larger crystallites in the range 4 to 6 μm.

EXAMPLE 11

Glass No. 7 was subjected to a similar regime to that of Example 8 and was finally held at 1030° C. for 5 minutes. The total heating process time was 10 minutes and the resulting glass ceramic had a modulus of rupture of 175 MN.m.$^{-2}$ and an expansion coefficient of $32.1 \times 10^{-7}$ ° C.$^{-1}$. The size of β-spodumene crystallites in the ceramic was in the range 0.5 to 1.5 μm.

EXAMPLE 12

Glass No. 8 was processed in the manner described above to produce a supported layer which was then cooled to about 650° C. The layer was then heated to 765° C. and held at that temperature for 5 minutes followed by rapid heating at the rate of 120° C. min.$^{-1}$ to 850° C. and then at 48° C. min.$^{-1}$ to a temperature of 1070° C. The total heating process time was 9.5 minutes.

The resulting glass ceramic material had a modulus of rupture of 100 MN.m.$^{-2}$, an expansion coefficient of $12 \times 10^{-7}$ ° C.$^{-1}$ and comprised crystallites of zirconia and of β-eucryptite of a size in the range 1 to 5 μm.

EXAMPLE 13

Glass No. 8 was cooled on tin from 1400° C. to 790° C. at a rate of 60° C. min.$^{-1}$. It was held at 790° C. for 10 minutes and then heated at 40° C. min.$^{-1}$ to 980° where it was held for 10 minutes, and then cooled. The resulting glass ceramic had a modulus of rupture of 110 MN.m.$^{-2}$ and an expansion coefficient of $-7 \times 10^{-7}$ ° C.$^{-1}$ and consisted of crystallites of β-spodumene solid solution and zirconia with a size range of 0.5 to 5 μm.

EXAMPLE 14

Glass No. 9 was melted, shaped on the molten tin support into the form of a sheet of material, and then cooled to a temperature of about 650° C. and thereafter the glass was heated at the rate of 150° C. per minute up to 1060° C. Growth centers appeared at about 740° C. and the material was held at that temperature for 5 minutes. By the time the material reached 1060° C. it had been transformed into a glass ceramic material having a modulus of rupture of 100 MN.m.$^{-2}$, an expansion coefficient of $11 \times 10^{-7}$ ° C.$^{-1}$ and a crystallite size of 3 to 5 μm. The crystalline phase was β-spodumene and the degree of crystallinity was greater than 85%. The heating process time was 7 minutes.

EXAMPLE 15

Glass No. 10 was shaped on a molten tin support into the form of a sheet and the shaped supported material was cooled below 700° C. and then heated rapidly at the rate of 90° C. min.$^{-1}$ up to a temperature of 1050° C., at which temperature it was held for 4 minutes. The centers of incipient crystal growth were believed to have formed during that rapid heating through the temperature region about 710° C. The glass ceramic material had a modulus of rupture of 120 MN.m.$^{-2}$ and an expansion coefficient of $24.9 \times 10^{-7}$ ° C.$^{-1}$. The crystalline phase was β-quartz solid solution and the crystallite size in the range 3 to 6 μm., with some small 0.1 μm. crystallites. The heating process time was 8 minutes.

EXAMPLE 16

Glass No. 11 was melted, poured onto a support of molten tin to take the form of a supported sheet and cooled at an average rate of 70° mm.$^{-1}$ to a temperaure of 780° C. at which temperature the sheet was held for 10 minutes. Thereafter the supported material was rapidly heated at a rate of 40° C. min.$^{-1}$ up to a temperature of 1150° C. where it was held for 10 minutes. The modulus of rupture of the resulting glass ceramic material was 89 MN.m.$^{-2}$ and the coefficient of thermal expansion was $0.5 \times 10^{-7}$ ° C.$^{-1}$. The crystallite size was 5 to 8 μm., the crystals consisting of β-spodumene solid solution and zirconia, and the total process time was 30 minutes.

EXAMPLE 17

Glass No. 11 was melted, poured onto a support of molten tin to take the form of a supported sheet and cooled to a temperature of 775° C. at which temperature the sheet was held for 5 minutes. Thereafter the material was heated at a rate of 120° C. min.$^{-1}$ to 1100° C. where it was held for 10 minutes and thereafter immediately cooled. The modulus of rupture of the resulting translucent, white glass ceramic was 124 MN.m.$^{-2}$, and the coefficient of expansion was $-7 \times 10^{-7}$ ° C.$^{-1}$. The crystal phases were β-eucryptite with a trace of β-spodumene and zirconia and the crystallite size distribution was in the range 2 to 10 μm. Heating process time was 8 minutes.

EXAMPLE 18

The process of Example 17 was repeated with a heating rate of 48° C. min.$^{-1}$. An opaque white glass ceramic resulted, having a modulus of rupture of 110 MN.m.$^{-2}$. The crystal phases present were β-spodumene solid solution with a trace of β-eucryptite and zirconia, and a crystallite size distribution in the range 5 to 10 μm. The heating process time was 12 minutes.

EXAMPLE 19

Glass No. 11 after initial thermal treatment for 10 minutes at 775° C. was heated at the rate of 120° C. min.$^{-1}$ up to 1100° C. and was then rapidly cooled, thus preserving in the material the crystalline state achieved by the time the glass had reached 1100° C. The total process time was only 13 minutes and the modulus of rupture of the resulting material was 83 MN.m.$^{-2}$, and the coefficient of expansion was $7 \times 10^{-7}$ ° C.$^{-1}$. The crystallite size was distributed in the range 5 to 15 μm. and the crystalline phases were β-eucryptite with minor amounts of β-spodumene and zirconia.

EXAMPLE 20

In a further experiment with glass No. 11 the melt was formed and the shaped material on the molten tin support was cooled to 775° C. and was held at that temperature for 10 minutes. Thereafter the shaped supported material was heated at the rate of 48° C. min.$^{-1}$ to a hold temperature of 1100° C. and was then immediately cooled. The modulus of rupture of the resulting glass ceramic was 97 MN.m.$^{-2}$ and the size of the crystallites of β-spodumene and zirconia was distributed in the range 5 to 10 μm. The total process time was 17 minutes.

EXAMPLE 21

Glass No. 12 which is similar to glass No. 11 was held at 730° C. for 8 minutes to produce the initial uniform distribution of growth centers through the material. The shaped material was then heated at the rate of 300° C. min.$^{-1}$ up to a temperature of 1080° C. and was held at that temperature for 5 minutes. The total process time was 14 minutes and the resulting glass ceramic material had a modulus of rupture of 101 MN.m.$^{-2}$, and a crystallite size distribution in the range 1 to 5 μm. of the crystalline phases β-spodumene solid solution and zirconia. The degree of crystallinity was greater than 90%.

EXAMPLE 22

Glass No. 12 was cooled on tin from 1400° C. to 750° C. at an average rate of 90° C. min.$^{-1}$. The glass was held at 750° C. for 15 minutes and was then reheated to 1100° C. at an average rate of 70° C. min.$^{-1}$, and was held at 1100° C. for 15 minutes. The product was a fine textured glass ceramic having a modulus of rupture of 119 MN.m.$^{-2}$. The total process time was 35 minutes.

EXAMPLE 23

Glass No. 13 was melted and poured onto a molten tin support and thereafter cooled below 700° C. The shaped material was then heated at a rate of 100° C. min.$^{-1}$ to a temperature of 1090° C. and was held at that temperature for 3 minutes. Centers of crystal growth developed in the temperature region around 740° C. The resulting glass ceramic material had a modulus of rupture of 165 MN.m.$^{-2}$. The crystalline phases were β-spodumene and rutile, and the crystallite size was in the range 2 to 4 μm. Total heating process time was 7 minutes.

EXAMPLE 24

Glass No. 13 was melted, poured onto the molten tin support and thereafter cooled below 700° C. The shaped material was then heated at the rate of 110° C. min.$^{-1}$ up to a temperature of 1150° C. and held at that temperature for 4 minutes. Centers of crystalline growth developed at about 740° C. The modulus of rupture of the resulting glass ceramic material was 137 MN.m.$^{-2}$ and the expansion coefficient 13.7×10$^{-7}$ °C.$^{-1}$. The crystalline phases present were β-spodumene and rutile and the crystallite size distribution was in the range 2 to 4 μm. The total process time was 8 minutes.

EXAMPLE 25

Glass No. 14 was subjected to the same procedure as in Example 1 and after cooling in supported sheet form was heated rapidly at a rate of 150° C. min.$^{-1}$ through a temperature of 780° C. at which the embryonic centers of crystal growth are believed to form in the glass and thereafter at the same rate up to 1070° C. The resulting glass ceramic material was immediately cooled so that it retained a crystalline state achieved at 1070° C. and the material was found to have a modulus of rupture of 89 MN.m.$^{-2}$, an expansion coefficient of 33×10$^{-7}$ °C.$^{-1}$ and a crystallite size distribution of 0.1 to 0.3 μm. This gave an extremely fine-grained glass ceramic material. The total heating process time was only 2.5 minutes.

EXAMPLE 26

The same glass No. 14 was heated at a rate of 300° C. min.$^{-1}$ up to 1080° C. and the glass ceramic material which had formed by the time that high temperature was obtained had a modulus of rupture of 101 MN.m.$^{-2}$, an expansion coefficient of 9×10$^{-7}$ °C.$^{-1}$ and a crystalline size in the range 5 to 10 μm. The crystalline phases present were β-spodumene solid solution and zirconia. The heating process time was only 1 minute.

EXAMPLE 27

Glass No. 15 was processed in the same way being cooled initially below 500° C. and then heated at the rate of 30° C. per minute. In the region of 530° C. the glass as it is heated passes through a range of temperature where the formation of embryonic centers of crystal growth is initiated and the heating of the glass at the rate of 30° C. min.$^{-1}$ continued up to 800° C. where the material was held for 12 minutes. The resulting glass ceramic material had a modulus of rupture of 190 MN.m.$^{-2}$ and an expansion coefficient of 107×10$^{-7}$ °C.$^{-1}$. The crystalline phases present were lithium disilicate and α-cristobalite with a crystallite size distribution in the range 0.2 to 0.4 μm. The heating process time was 23 minutes.

EXAMPLE 28

The same glass No. 15 was heated from the temperature of about 500° C. at a rate of 76° C. min.$^{-1}$ to 860° C. where it was held for 4 minutes. The modulus of rupture of the resulting glass ceramic materials was 196 MN.m.$^{-2}$. In this example the total process time was 9 minutes. The same crystalline phases lithium disilicate and α-cristobalite were present and the crystallite size was in the range 0.5 to 1.0 μm.

EXAMPLE 29

Glass No. 16 was cooled on a tin support from 1190° C. to 720° C. at an average rate of 80° C. min.$^{-1}$. The material was held at 720° C. for 10 minutes and then heated at the rate of 35° C. min.$^{-1}$ to 930° C. and was held at that temperature for 10 minutes and then cooled. The total process time was 38 minutes. The resulting glass ceramic material had a modulus of rupture of 124 MN.m.$^{-2}$, and a coefficient of expansion of 2×10$^{-7}$ °C.$^{-1}$, and consists of crystallites of β-eucryptite and zirconia with an average crystallite size of 4 μm.

EXAMPLE 30

Glass No. 17 was subjected to the same procedure. The crystal growth centers were believed to appear in the material at about 805° C. Thereafter the rate of rapid heating was at the rate of 130° C. min.$^{-1}$ up to 1170° C. where the material was held for 9 minutes. The resulting material had an expansion coefficient of 100×10$^{-7}$ °C.$^{-1}$ and the total process time was 12 minutes. The crystalline phases were α-quartz, magnesium aluminium titanate and sapphrine, with crystallite size in the range 0.1 to 0.3 μm.

EXAMPLE 31

The process of Example 30 was repeated with glass No. 17 and with a heating rate of 160° C. min.$^{-1}$ to 1150° C., followed by further heating at 10° C. min.$^{-1}$ to 1220° C. The material was held at 1220° C. for 4 minutes. The resulting glass ceramic had a modulus of rupture of 195 MN.m.$^{-2}$, an expansion coefficient of 110.5×10$^{-7}$ °C.$^{-1}$, the same crystalline phases as in Example 30 and crystallite size distribution in the range of 0.2 to 0.6 μm. The heating process time was 14 minutes.

EXAMPLE 32

Glass No. 18 was melted and supported in layer form on a molten tin support and thereafter cooled to 700° C.

The cooled shaped material was then heated on its support at the rate of 150° C. min.$^{-1}$ up to a temperature of 1100° C. Centers of crystal growth formed at about 750° C., and by the time the material reached 1100° C., it had been transformed to a glass ceramic material having a modulus of rupture of 121 MN.m.$^{-2}$, and an expansion coefficient of $71 \times 10^{-7}$ ° C.$^{-1}$. The heating process time was 2.5 minutes and the crystalline phases present were enstatite and magnesium aluminium titanate with a crystallite size of about 0.5 μm.

EXAMPLE 33

Glass No. 18 was again processed but at a higher heating rate of 300° C. min.$^{-1}$ up to a temperature of 1130° C. The glass ceramic material achieved at that temperature and in a heating process time of only 1.5 minutes had a modulus of rupture of 150 MN.m.$^{-2}$ and an expansion coefficient of $70 \times 10^{-7}$ ° C.$^{-1}$. The same phases and crystallite size as in Example 32 were observed.

EXAMPLE 34

Glass No. 19 was formed and when in the form of a shaped sheet supported on molten metal was cooled below 800° C. and thereafter rapidly heated at the rate of 45° C. min.$^{-1}$ through the temperature region around 820° C. where growth centers are produced, up to a temperature of 1070° C. and by the time the material reached that temperature in a heating process time of 6 minutes, it had the form of a fine-grained glass ceramic with a modulus of rupture of 92 NM.m.$^{-2}$, an expansion coefficient of $112 \times 10^{-7}$ ° C.$^{-1}$ and a crystallite size distribution in the range of 1 to 2 μm. The crystalline phases present are nepheline and hexacelsian.

EXAMPLE 35

Glass No. 19 was subjected to a higher heating rate in the region of 150° C. min.$^{-1}$ up to a temperature of 1060° C. and a somewhat stronger material having a modulus of rupture of 107 MN.m.$^{-2}$ and an expansion coefficient of $114 \times 10^{-7}$ ° C.$^{-1}$ resulted. The crystallite size distribution was in the range 3 to 5 μm., and the crystalline phases were α-pseudo-hexacelsian and carnegieite. The heating process time was 2 minutes.

EXAMPLE 36

Glass No. 20 was cooled on a tin support to 730° C., was held at that temperature for 10 minutes, and was then heated at a rate of 120° C. min.$^{-1}$ to a temperature of 1100° C. and immediately cooled. The resulting glass ceramic had a modulus of rupture of 113 MN.m.$^{-2}$. The principal crystalline phase was β-spodumene with a small amount of β-eucryptite and a trace of α-quartz, and the crystallite size distribution was from 1 to 2 μm.

EXAMPLE 37

Glass No. 20 was cooled on a tin support to 730° C. and was held at that temperature for 10 minutes, and then heated at a rate of 120° C. min.$^{-1}$ to a temperature of 1100° C. and held at that temperature for 10 minutes. The resulting glass ceramic had a modulus of rupture of 148 MN.m.$^{-2}$. The crystalline phases were β-spodumene solid solution and α-quartz, and the crystallite size distribution was in the range 1 to 2 μm.

EXAMPLE 38

Glass No. 11 was formed and a sample was heated in a covered graphite vessel in a muffle furnace at 780° C. for 10 minutes at which temperature crystal growth centers or nuclei are formed. The sample was then rapidly heated at 120° min.$^{-1}$ to a crystallization temperature of 1100° C., at which it was held for 10 minutes, after which it was cooled at 300° C. min.$^{-1}$ to room temperature. A fine, white crystalline glass ceramic was obtained with no cracking and only slight transverse distortion. The modulus of rupture was 64 MN.m.$^{-2}$ and the crystalline phases present were β-spodumene solid solution and α-quartz, with tetragonal and monoclinic zirconia.

EXAMPLE 39

Glass No. 11 was treated as in Example 38 except that the heating rate was increased to 140° C. min.$^{-1}$. The product obtained was similar in appearance, but had a higher modulus of rupture of 69 MN.m.$^{-2}$ and the crystalline phases present were β-spodumene and tetragonal zirconia.

EXAMPLE 40

Glass No. 11 was treated as in Example 38 except that the heating rate was further increased to 240° C. min.$^{-1}$. The product was similar in appearance and crystalline phases to that of Example 39, with a modulus of rupture of 67 MN.m.$^{-2}$.

EXAMPLE 41

Glass No. 11 was again treated as in Example 38 except that the heating rate was 430° C. min.$^{-1}$. The product was similar in appearance and crystalline phases to that of Example 39, with a modulus of rupture of 72 MN.m.$^{-2}$. Crystallite size was around 10 μm.

EXAMPLE 42

Glass No. 11 was again treated as in Example 38, except that the rate of heating was 480° C. min.$^{-1}$. The glass ceramic produced appeared similar to that of Example 38, though with even less distortion. The modulus of rupture was 62 MN.m.$^{-2}$ and the crystalline phases present were β-spodumene with tetragonal zirconia and a small amount of monoclinic zonconia. It would appear that the heating rate of 480° C. min.$^{-1}$ is about the maximum that can be tolerated.

In each of the examples the invention is described with reference to the forming of a single sheet of glass ceramic material, but it will be understood that the invention also includes a continuous method of manufacturing a ceramic material in which a melt of the thermally crystallizable material is continuously formed and advanced in ribbon form along a nonwettable support, e.g. a molten tin bath, as described above with reference to FIG. 4.

For such a continuous method, good thermal contact between the material and the support is important so that the material can be accurately thermally controlled during its advance. A molten tin bath is particularly effective in this respect. The advancing ribbon is first cooled to a temperature at which the embryonic centers of crystal growth develop in the material and thereafter the advancing ribbon is maintained at that temperature for a limited time during its further advance which is sufficient to generate within the material the required distribution of embryonic centers. This may take place while the material is being heated through a temperature range conducive to the generation of the dispersion of growth centers. Then during the further advance of the ribbon it is subjected to a steeply rising temperature gradient whose slope is sufficient to retain in the ribbon a crystalline dispersion having the character of the dispersion of embryonic growth centers as the material is rapidly heated and crystal growth is rapidly initiated. Having arrived at a predetermined maximum temperature, the value of that temperature and the time of holding the material at it are chosen to consolidate a required degree of crystallinity of a desirable crystal phase or phases. The ribbon has then become sufficiently stiffened to hold its form, even though at a high temperature, but it is cooled somewhat before removal from the support.

An inter-dependence exists between the temperature/time regime for the development of the dispersion of embryonic centers of crystal growth, and the controlled rate of rapid heating to produce the required degree of crystallinity, crystallite size distribution and crystal species in the glass ceramic. With particular materials a time at a certain temperature for the development of the growth centers has been observed to be dependent on the rate of heating subsequently applied in order to give a desired result. The rate of internal crystallization, and hence the rate of formation of the glass ceramic, is influenced by the concentration of centers of crystal growth in the dispersion and the time the material is subjected to that temperature/time regime.

This inter-dependence between the temperature/time regime for the development of the dispersion of embryonic centers of crystal growth and the rate of rapid heating also extends to the physical properties of the glass ceramic material produced, notably the modulus of rupture of the glass ceramic.

When experimenting with glass No. 11 a variation of the temperature of the crystallization exotherm, i.e. the temperature at which the rate of heat output associated with crystal growth is at a maximum, with rate of rapid heating was observed. The greater the rate of heating, the higher is the temperature at which the crystallization exotherm is observed. For example with a heating rate of 48° C. min.$^{-1}$ the exotherm temperature was 975° C. and the ceramic produced had a modulus of rupture of 97 MN.m.$^{-2}$; and with a heating rate of 120° C. min$^{-1}$, as in Example 19, the exotherm temperature was 1050° C. and the modulus of rupture of the glass ceramic was 83 MN.m.$^{-2}$.

At somewhat lower heating rates, after the same pre-treatment, a usable glass ceramic could not be produced. At a heating rate of 10° C. min.$^{-1}$ the exotherm temperature was 890° C. but the specimen cracked during crystallization; and at a heating rate of 15° C. min.$^{-1}$ this temperature was 910° C. and the specimen also cracked.

Variation of exotherm temperature with variation of the time for the development of centers of crystal growth was also observed. The experiments used glass No. 8 and a fixed temperature of 765° C. was chosen for the development of crystal growth centers. Three pieces of glass were treated, and the time at 765° C. was different for each sample. After the pre-treatment at 765° C. each piece was heated at a rate of 120° C. min.$^{-1}$ to 850° C. and then at 30° C. min.$^{-1}$ to 1070° C. and cooled immediately thereafter. The results observed are set out in Table II below:

TABLE II.—GLASS NO. 8

| Time at 765° C. (min.) | Exotherm temperature (° C.) | Modulus of rupture (MN.m.$^{-2}$) | Crystallite size (μm.) |
|---|---|---|---|
| 5 | 1,000 | 132 | 1–5 |
| 20 | 920 | 112 | 1–3 |
| 60 | 890 | 108 | 1.5–4 |

It was apparent that as the time for development of crystal growth centers increased, both the exotherm temperature and the strength of the product decreased, although the crystallite size was substantially constant and the same crystal phases were present, namely β-eucryptite and zirconia with minor amounts of β-spodumene.

Thus both the time allowed for the development of centers of crystal growth and the rapid heating rate can be chosen to determine the physical properties of the glass ceramic, indicating a link between the modulus of rupture of the glass ceramic and the exotherm temperature.

Other ways of regulating the physical properties of the glass ceramic produced have been observed within the context of rapid change of the thermal condition of the material.

When working with glass No. 11 stronger products have been obtained at the ends of the range of rapid heating rates than in the middle of the range. Example 17 illustrates the production of strong, fine-grained glass ceramic when the heating rate is 120° C. min.$^{-1}$, which rate is compatible with the previous thermal history of the material, which, in Example 17, was held at 775° C. for 5 minutes. When employing such a high heating rate it appears that crystallization occurs at high temperatures and consequently when the material is in a state of high overall deformability as it is being transformed into the glass ceramic.

At a less rapid heating rate of 48° C. min.$^{-1}$, as in Example 18, a strong product was also obtained, apparently because substantially only one crystal phase, β-spodumene solid solution, is formed. Apparently the pre-treatment by holding at 775° C. for 5 minutes is also appropriate to this lesser heating rate.

Intermediate heating rates in the range produced weaker products from glass No. 11. A piece of glass was held at 775° C. for 5 minutes and then heated at the rate of 86° C. min.$^{-1}$ to 1100° C. The glass ceramic produced had a modulus of rupture of 36 MN.m$^{-2}$. Another similar piece of glass was heated at the rate of 64° C. min.$^{-1}$ up to 1100° C., and was transformed into a glass ceramic whose modulus of rupture was 34 MN.m$^{-2}$. At both these intermediate heating rates a mixture of crystal phases appeared notably β-eucryptite with minor amounts of β-spodumene and zirconia. It was apparent that in order to produce a strong material at these intermediate heating rates, the time for development of the dispersion of centers of crystal growth could be varied as necessary.

Thus by appropriate choice of a temperature/time regime for the production in a vitreous material of a uniform dispersion of centers of crystal growth, and of the subsequent rate of rapid heating of the material, there can be selectively produced from each crystallizable vitreous material a range of strong glass ceramic materials each having a fine crystalline micro-structure and being uncracked and undeformed. Process time by the method of the invention is much shorter than has been possible hitherto, at most up to about 40 minutes, often in the region of 10 minutes, and even as short as 1 minute.

We claim:

1. A method of manufacturing a fine-grained glass ceramic material from a thermally-crystallizable vitreous material, comprising shaping the material and thereafter maintaining support of the shaped material, heating the supported material to a temperature $T_N$ which lies between $T_g$ and $T_g+220°$ C., where $T_g$ is the transformation temperature of the vitreous material, to generate throughout the material a uniform dispersion of embryonic centers of incipient crystal growth without substantial accretion of crystalline material, and the rapidly heating the material at a rate controlled in the range 30° C. min.$^{-1}$ to 480° C. min.$^{-1}$ to a predetermined crystallization temperature in the range 800° C. to 1250° C. to effect fine-grained crystal growth on those embryonic centers to a desired degree of crystallinity throughout the material, said controlled rate of rapid heating being sufficient to avoid substantial reabsorption of embryonic centers into the material, said rapid heating being accomplished while the viscosity of the vitreous material is at a value permitting rapid stress relaxation without cracking of the glass ceramic material.

2. A method according to claim 1 wherein the supported material is held at said temperature $T_N$ for a period of between 2 and 30 minutes to generate said uniform dispersion of centers.

3. A method according to claim 1 wherein the supported material is subjected to a continuous rapid heating schedule in which said material is heated through said temperature $T_N$ to generate said uniform dispersion of centers without substantial accretion of crystalline material and then, without a hold, is rapidly heated at said controlled rate to said crystallization temperature.

4. A method according to claim 1 wherein said fine-grained glass ceramic material has a degree of crystallinity of at least about 85 percent.

5. A method according to claim 1, wherein the support for the material is provided by a non-wettable support material of high thermal conductivity.

6. A method according to claim 5, wherein the non-wettable support is a bath of molten metal, the melt is poured onto the bath at a controlled rate and is advanced in ribbon form along the bath as it crystallizes, and the glass ceramic ribbon when formed is cooled until it can be taken unharmed from the bath.

7. A method according to claim 1 wherein the vitreous material is an $Li_2O$—$Al_2O_3$—$SiO_2$ composition containing a nucleating agent.

8. A method according to claim 7 wherein the nucleating agent comprises $P_2O_5$.

9. A method according to claim 7 wherein the nucleating agent comprises $ZrO_2$.

10. A method according to claim 8 wherein the nucleating agent comprises between 3.3 and 7.0 wt. percent $ZrO_2$ and from 1.0 to 2.5 wt. percent $P_2O_5$.

11. A method according to claim 7 wherein the nucleating agent comprises $TiO_2$.

12. A fine-grained glass ceramic material produced by the method of claim 1.

References Cited

UNITED STATES PATENTS

| | | | |
|---|---|---|---|
| 3,464,807 | 9/1969 | Pressau | 65—33 |
| 3,282,711 | 11/1966 | Lin | 65—33 XR |
| 3,519,445 | 7/1970 | Mac Dowell et al. | 65—33 XR |
| 2,741,877 | 4/1956 | DuBruvolny | 65—33 XR |
| 3,252,811 | 5/1966 | Beall | 65—33 XR |
| 3,499,773 | 3/1970 | Petticrew | 65—33 XR |
| 3,485,644 | 12/1969 | Shonebarger | 65—33 XR |

OTHER REFERENCES

Handbook of Glass Manufacture, vol. II, Fay V. Tooley, Ogden Pub., New York, pp. 193 to 199, 1960 date.

FRANK W. MIGA, Primary Examiner

U.S. Cl. X.R.

65—182 R, 65